United States Patent [19]

Höltje

[11] 4,426,231
[45] Jan. 17, 1984

[54] LIGHT STABLE QUINACRIDONEQUINONE PIGMENTS

[75] Inventor: Wilfried G. Höltje, Wilmington, Del.

[73] Assignee: E. I. Du Pont de Nemours and Company, Wilmington, Del.

[21] Appl. No.: 407,644

[22] Filed: Aug. 12, 1982

[51] Int. Cl.³ ............................................. C07F 15/00
[52] U.S. Cl. .......................... 106/288 Q; 106/308 B; 546/10
[58] Field of Search ...................... 106/288 Q, 308 B; 546/10

[56] References Cited

U.S. PATENT DOCUMENTS

| | | | |
|---|---|---|---|
| 2,913,348 | 11/1959 | Jackson | 106/288 Q |
| 3,085,023 | 4/1963 | Ehrich | 106/308 B |
| 3,121,718 | 2/1969 | Higgins | 546/10 |
| 3,545,994 | 12/1970 | Lott et al. | 106/308 B |

Primary Examiner—Helen M. McCarthy

[57] ABSTRACT

Quinacridonequinone pigments photostabilized with from 2.5 to 20 wt. % $Mn(OH)_2$ are disclosed. The $Mn(OH)_2$ is precipitated on the pigment from an aqueous solution of a divalent manganese salt by either adding a base or adding urea to the salt solution and heating.

4 Claims, No Drawings

LIGHT STABLE QUINACRIDONEQUINONE PIGMENTS

BACKGROUND OF THE INVENTION

1. Field of the Invention

The present invention relates to the photostabilization of quinacridonequinone pigments by surface treatment with non-noxious manganese hydroxide.

2. Background Art

Quinacridonequinone (QAQ) is a golden-yellow compound exhibiting excellent pigmentary characteristics except for a deficiency in lightfastness in some applications. It can be photostabilized by forming solid solutions with such stabilizers as quinacridone and derivatives (U.S. Pat. No. 3,160,510), N,N'-diphenyl-p-phenylenediamine (U.S. Pat. No. 3,341,345), 6,13-dihydroquinacridone (U.S. Pat. No. 3,748,162) or 2-anilinoacridone and related compounds (U.S. Pat. No. 4,286,998).

Another mode of imparting increased photostability to QAQ is to apply a dry or wet surface treatment with compositions derived from metal salts such as set forth below.

U.S. Pat. No. 2,913,348 (1959) discloses coating and pigment—including QAQ—compositions containing basic nickel carbonate or nickel hydroxide as stabilizers. Basic nickel carbonate can be incorporated as a dry solid by dispersion grinding or can be precipitated from nickel chloride and sodium carbonate solutions in an aqueous slurry of the pigment.

U.S. Pat. No. 3,085,023 (1963) discloses pigment compositions of improved lightfastness consisting of quinacridones, isoquinacridones or quinacridonequinones or their combination and a small amount of manganese carbonate precipitated in the presence of pigment from solutions of manganous sulfate and sodium carbonate.

U.S. Pat. No. 3,121,718 (1964) discloses nickel, zinc and copper chelates of QAQ of improved lightfastness and their preparation by reacting QAQ and metal salt at elevated temperature in dimethylformamide or other high-boiling water-soluble polar organic solvents.

DETAILED DESCRIPTION

The present invention relates to novel QAQ containing color pigments photostabilized by wet surface treatment with manganese hydroxide and to processes of applying such surface treatment. The resulting pigments are more intense (bright) and less green in color compared to the same base pigments treated by conventional nickel carbonate precipitation (U.S. Pat. No. 2,913,348); further manganese is considered non-noxious. QAQ pigments treated in accordance with the present invention have better lightfastness than the same base pigments treated by manganese carbonate precipitation (U.S. Pat. No. 3,085,023). The present wet surface treatment protects QAQ from photodegradation and consequently photostabilizes all QAQ containing pigment compositions. It is believed that semi-chelate type complexes of $Mn^{2+}$ with QAQ molecules of the formula

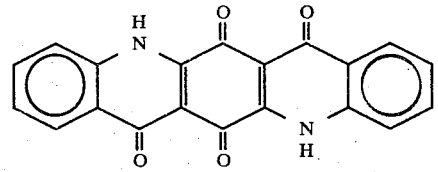

and possibly with $OH^-$ ions are formed on the surface of the pigment particles.

The preferred pigments for use in the present invention are quinacridonequinone and solid solutions thereof containing at least 40% quinacridonequinone and the remainder one or more of quinacridone, dihydroquinacridone, anilinoacridone, and 4,11-dichloroquinacridone.

The pigment to be treated preferably is prepared as water-wet presscake consisting of particles of pigmentary size. This is achieved by dispersion milling, high-turbulence drowning, acid pasting or other particle size reduction methods. Dispersion milling and high-turbulence drowning have been used in the appended Examples. Both procedures end with leaching and water-washing steps. The water-wet presscakes thus produced are relatively easily dispersed in excess water by high-speed stirring or treatment with a homogenizer, vibromixer or other intense agitation means to yield a predominantly deagglomerated slurry. Deagglomeration of the pigment is important, in order to achieve heterogeneous nucleation of the manganese hydroxide composition during the precipitation instead of homogeneous nucleation.

The homogeneous aqueous slurry of QAQ pigment is heated to 40°-100° C., preferably 70° C., under agitation. Its pH is adjusted to near neutral, preferably 7.2, with dilute aqueous base solution and maintained for a while. An aqueous solution of a water-soluble manganese (II) salt such as $MnCl_2.4H_2O$ or $MnSO_4.H_2O$ is added to the agitated slurry. The amount of manganese (II) salt can vary between 2.5% and 20% by weight of the amount of QAQ used (dry weight), calculated as hypothetically formed $Mn(OH)_2$. The maximum stabilization effect appears to be achieved with 15% "$Mn(OH)_2$"; increases beyond do not seem to give significant improvements and may cause other deleterious long-term "salt" effects like humidity whitening.

The precipitation of the manganese composition is effected by slowly adjusting the pH of the slurry, under continued heating and intense agitation, to a value between 7.5 and 10.0, preferably 9.0, by adding dropwise an aqueous solution of an alkaline hydroxide like NaOH or KOH. The lower pH limit reflects the necessity to apparently initiate $Mn^{2+}$ hydrolysis and proton dissociation of QAQ; the upper pH limit is dictated by the fact that QAQ undergoes changes in the strong alkaline region resulting, among other things, in reddish color and lower photostability. Slow addition of base is essential to form the desired surface precipitate of the Mn species on QAQ by heterogeneous nucleation and to not just precipitate $Mn(OH)_2$ particles separately by homogeneous nucleation.

The pH of the slurry is monitored and readjusted when necessary while heating and intense agitation continue for 15 minutes or more. An optional surfactant treatment can be added at this point, tailored to the requirements of the paint or polymer system the pigment is to be used in; improvements in rheology etc. may result.

Another mode of providing the hydroxyl ions necessary to form the Mn/QAQ surface precipitate in a uniform way throughout the slurry is to dissolve in the slurry a water-soluble compound such as urea that can be decomposed by heating to yield $OH^-$ ions. Mixing and agitation which is adequate to achieve uniform $OH^-$ distribution throughout the slurry to avoid locally high $OH^-$ concentrations at the "drop-in" point which would result in separate $Mn(OH)_2$ precipitation, normally will also achieve uniform heat distribution. Enough urea has to be added to generate a sufficient amount of $OH^-$ ions. The agitated slurry has to be heated to a sufficiently high temperature such as 90° C. to 100° C., preferably 95° C., for a considerable length of time, at least 30 minutes, and preferably 3 hours, to effect the decomposition of urea. The pH values of the slurry measured at the end of this time are usually between 6 and 7. To make sure enough hydroxyl ions are being supplied, the pH of the slurry is adjusted to 7.5 or higher by dropwise adding dilute aqueous NaOH or other base solution, under intensive agitation, and the slurry is stirred for another 15 minutes or more.

In both modes of precipitation, the slurry is filtered, the filter cake washed with water, dried overnight at 60°–80° C. in a vacuum oven under slight $N_2$ purge and pulverized. The pigment products are characterized by powder X-ray diffraction, including line broadening to determine crystallite size, by analysis of Mn content, by paint-simulating rubouts and fadeometer exposure and by Florida exposure of pigmented metal panel coatings prepared as described in the Examples.

The products of this invention are useful as photostable colored pigments in finishes, coatings and plastics.

EXAMPLES

EXAMPLE 1

Twenty g of semiworks synthesized crude, predried QAQ are slowly combined with 85 ml concentrated (96%) sulfuric acid under intense stirring in a round-bottom flask equipped with thermometer, mechanical stirrer and $CaSO_4$ drying tube and dissolved. The temperature is kept at 25°–30° C. by external water/ice bath cooling to prevent sulfonation of the QAQ. Care is taken to dissolve all of the QAQ. The $QAQ/H_2SO_4$ solution is then used to generate an aqueous slurry of finely divided, pigmentary QAQ by high-turbulence drowning, as described in U.S. Pat. No. 2,844,581. In this process, a pigment solution and water in a specifically designed apparatus are separately propelled by pressurized $CO_2$ gas through jets directed to let the two streams intersect. Water is used in excess and effects turbulent mixing and a rapid hydrolysis of the pigment solution regenerating the pigment in very small, highly disordered particle form since there is no time for orderly crystal growth. In this experiment, 2 liters of water and a $CO_2$ pressure of 50 psi are used. The temperature of the resulting aqueous pigment slurry is about 20° C. at the beginning of the drowning process and about 40° C. at its end. To convert the pigment particles into a more stable, less disordered and slightly larger form, the drowned slurry is heated with stirring to 90° C. and held for one hour at that temperature. A solution of 0.5 g isopropylammonium dodecylbenzene sulfonate in 0.8 g perclene is added to the slurry and the slurry held at 95° C. for 0.5 hour, under continued stirring. The slurry is filtered and the filter cake washed with hot water until sulfate-free as determined by combining the filtrate with $BaCl_2$ test solution for a potential $BaSO_4$ precipitation.

The water-wet pigment filter cake, also called presscake, is reslurried in 1 liter of water, homogenized by intensive stirring and the slurry heated to 70° C. The pH is adjusted to 7.2 with dilute aqueous sodium hydroxide solution. Stirring is continued while maintaining the pH at 7.2 and the temperature at 70° C. A solution of 2.10 g $MnCl_2.4H_2O$ in 50 ml $H_2O$ is added slowly under intense agitation and both agitation and heating are continued. After 15 minutes, 1/10 n aqueous NaOH solution is added dropwise under intense agitation to promote heterogeneous nucleation of the formed precipitate, until a pH of 9.0 is reached, as indicated by a pH meter. The pH is monitored and readjusted to 9.0 as required. Intense agitation and heating at 70° C. are continued for 15 minutes. The slurry is filtered, the filter cake washed with over 1 liter of water, dried overnight in a vacuum oven at 60° C. and pulverized.

A sample of the pigment and an equal amount of aluminum flake powder (weight ratio 50:50) are dispersed together in a thermoplastic acrylic resin vehicle forming a metallic lacquer. The metallic lacquer, after dilution with solvents, is sprayed onto suitably prepared metal panels. The coated panels are dried and exposed to weather and sun in Florida, facing south at an angle of 5° from the horizontal. The photodegradation of QAQ is determined periodically by measuring the decrease of QAQ's optical absorption at a wavelength of about 430 nanometers on the panels by diffuse reflectance spectroscopy. After three months in Florida, the sample pigment showed 12% QAQ loss.

By comparison, QAQ pigment prepared as outlined above but without manganese hydroxide precipitation, showed 21% QAQ loss after the same three moths in Florida.

EXAMPLE 2

Seventeen g of plant synthesized crude, predried QAQ are slowly combined with 85 ml concentrated (96%) sulfuric acid under intense stirring in a roundbottom flask equipped with thermometer, mechanical stirrer and $CaSO_4$ drying tube, and dissolved. An ice/water bath is used to keep the temperature below 30° C. to prevent sulfonation of the QAQ. After all of the QAQ is dissolved, 3 g of 6,13-dihydroquinacridone (DQA) are added to the solution and dissolved under agitation. The solution is drowned into water under high-turbulence conditions, as described in Example 1, to give a pigment slurry. The slurry is heated to 90° C. with stirring and held for one hour. A solution of 0.5 g isopropylammonium dodecylbenzene sulfonate in 0.8 g perclene is added to the slurry and the slurry held at 95° C. for 0.5 hour, with continued stirring. The slurry is filtered, the filter cake washed sulfate-free and kept under water.

The wet presscake is reslurried in 1 liter of water, dispersed well by intensive stirring and spatula action and heated to 70° C. The pH is adjusted to 7.2 with dilute aqueous sodium hydroxide. Stirring is continued while keeping the pH at 7.2 and the temperature at 70° C. A solution of 4.20 g $MnCl_2.4H_2O$ in 100 ml water is added slowly with stirring, and both stirring and heating are continued for 15 minutes. A 1/10 n aqueous NaOH solution is added dropwise under intense agitation until a pH of 8.5 is reached as measured by a pH meter. The pH is monitored and readjusted to 8.5 as required. Intense agitation and heating at 70° C. are continued for 15 minutes. The slurry is filtered, the filter cake washed with water, dried in a vacuum oven at 60°-70° C. and pulverized.

A sample of the pigment and an equal amount of aluminum flake powder are dispersed together in a thermoplastic acrylic resin vehicle to form a 50/50 metallic lacquer. The metallic lacquer, after dilution with solvents, is sprayed onto suitably prepared metal panels. The coated panels are dried and then exposed to sun and weather in Florida, facing south at an angle of 5° from the horizontal. The photodegradation of QAQ is determined periodically by measuring the decrease of QAQ's optical absorption at about 430 nm on the panels by diffuse reflectance spectroscopy. After three months in Florida, the sample pigment shows 3% QAQ loss, after one year 11% loss.

Control

For comparison, 20 g of the same solid solution of QAQ and DQA is prepared as wet pigmentary presscake by high-turbulence drowning as described above and treated with basic nickel carbonate according to U.S. Pat. No. 2,913,348. The drowning presscake is reslurried in 1 liter of water, dispersed well by intensive stirring and spatula action and heated to 70° C. The pH is adjusted to 7.2 with dilute aqueous sodium hydroxide. Stirring is continued while keeping the pH at 7.2 and the temperature at 70° C. A solution of 6.60 g $NiSO_4.6H_2O$ in 100 ml $H_2O$ is added slowly with stirring, and both stirring and heating are continued for 15 minutes. A solution of 4.20 g $Na_2CO_3$ in 100 ml $H_2O$ is added dropwise over 20 minutes. The slurry is stirred for 15 minutes at 70° C, filtered, the filter cake washed with water and dried overnight at 65° C. and pulverized.

A 50/50 metallic lacquer is prepared, as described above, from the sample pigment and aluminum flake, sprayed onto metal panels and exposed in Florida. After three months, the spectroscopically measured QAQ loss is 3%, after one year 11% as in the example above.

EXAMPLE 3

Eighty-five g of crude QAQ and 15 g of 2-anilinoacridone are slowly combined with 425 ml concentrated (96%) sulfuric acid under intense stirring in a roundbottom flask equipped with thermometer, mechanical stirrer and $CaSO_4$ drying tube and dissolved. An ice/water bath is used to keep the temperature below 30° C. to prevent sulfonation of the QAQ and the anilinoacridone. The solution is drowned into 6 liters of water under high-turbulence conditions, as described in Example 1 to give a pigment slurry. The temperature goes from 21° to 36° C. The slurry is heated to 90° C. with stirring and held for one hour. A solution of 2.5 g isopropylammonium dodecylbenzene sulfonate in 4.0 g perclene is added to the slurry and the slurry held at 95° C. for 0.5 hour, with continued stirring. The slurry is filtered, the filter cake washed sulfate-free and kept under water.

The wet presscake is reslurried in 5 liters of water and the pH adjusted to 7.0 with dilute aqueous sodium hydroxide. The slurry is homogenized twice in a Gaulin homogenizer set at 5,000 psi ($3.4 \times 10^7$ Pa). The slurry is heated to 70° C. A solution of 22.25 g $MnCl_2.4H_2O$ in 100 ml water is added over a 5 minute period and the slurry is stirred for an additional 15 minutes at 70° C. A 1 n aqueous NaOH solution is dripped in over a 20 minute period until pH 9 is reached. The slurry is kept at pH 9 and stirred for 15 minutes at 70° C. The slurry is filtered, the filter cake washed with 2 liters of water and dried in a vacuum at 65° C. and pulverized.

A 50/50 metallic lacquer is prepared, as described above, from the sample pigment and aluminum flake, sprayed onto metal panels and exposed in Florida. After three months, the spectroscopically measured QAQ loss is 2.8%.

EXAMPLE 4

The pigment starting material in this experiment, QAQ mill powder of pigmentary particle size, is generated from semiworks synthesized crude QAQ by dispersion milling in semiworks in the following way: 8.3 pounds of crude QAQ, 43.5 pounds of alum, a solution of 180 g isopropylammonium dodecylbenzene sulfonate in 744 g perclene, 100 pounds of nails of size 20d and 1000 pounds of cylpebs of size $1'' \times \frac{1}{2}''$ (2.54 cm $\times$ 1.27 cm), that is, steel cylinders functioning as grinding medium, are charged into a semiworks-scale ball mill and milled for 24 hours at a temperature between 140° and 158° F. After separation from nails and cylpebs, 52 pounds of mill powder are recovered.

To prepare pure QAQ presscake, 80 g of the above prepared powder are added to a solution of 44 ml of 96% $H_2SO_4$ in 2 liters of water; the resulting slurry is heated to boiling for 1 hour under stirring and filtered. The filter cake is washed sulfate-free with excess water and kept water-wet.

The wet filter cake is reslurried and dispersed well in 300 ml $H_2O$ under intensive agitation and heated to 70° C. The pH is adjusted to 7.5 with 1/10 n aqueous NaOH solution and maintained. Slowly, a solution of 1.25 g $MnCl_2.4H_2O$ in 30 ml $H_2O$ is added and stirring and heating are continued for 15 minutes. Dropwise, 1/10 n aqueous NaOh solution is added under intensive agitation until a pH of 9.5 is reached. The pH is monitored and adjusted when necessary while heating and agitation continue for 15 minutes. The slurry is filtered, the filter cake washed with water, dried overnight in a vacuum oven at 60° C. and pulverized.

A 50/50 metallic lacquer is prepared from the pulverized pigment, aluminum flake and thermoplastic acrylic resin vehicle, sprayed onto metal panels and exposed in Florida. After 3 months, the spectroscopically measured QAQ loss is 12%.

Control 1

For comparison, an untreated pigmentary QAQ sample is prepared from the above mill powder. As before, 80 g of the mill powder are added to a solution of 44 ml of 96% $H_2SO_4$ in 2 liters of water. The slurry, under stirring, is heated to boiling for 1 hour and filtered. The filter cake is washed sulfate-free with water and kept water-wet.

The wet presscake is reslurried and dispersed well in 300 ml $H_2O$ under intensive agitation and heated to 70° C. The pH is adjusted to 7.0 with 1/10 n aqueous NaOH solution and maintained. Stirring and heating are continued for 15 minutes. The slurry is filtered, the filter cake washed with water, dried overnight in a vaccum oven at 60° C. and pulverized.

A 50/50 metallic lacquer prepared from the pulverized pigment with aluminum flake and sprayed onto metal panels shows a spectroscopically measured QAQ loss of 19% after the same 3 months of exposure in Florida as above.

Control 2

For another comparison, a sample of pigmentary QAQ prepared from the above mill powder is treated with a surface precipitation of manganese carbonate. As before, 80 g of the mill powder are added to a solution of 44 ml of 96% $H_2SO_4$ in 2 liters of water; the slurry is stirred and heated to boiling for 1 hour and filtered. The filter cake is washed sulfate-free with water and kept water-wet.

The wet presscake is reslurried and dispersed well in 300 ml $H_2$ under intensive agitation and heated to 70° C. The pH is adjusted to 7.0 with dilute aqueous NaOH solution and kept at that level. A solution of 1.25 g $MnCl_2.4H_2O$ in 30 ml $H_2O$ is added causing the pH to drop to 6.3. Stirring and heating are continued for 15 minutes. A solution of 0.70 g $Na_2CO_3$ in 30 ml $H_2O$ is added dropwise over a period of 20 minutes under continued agitation and heating. The slurry is filtered, the filter cake washed with 1000 ml $H_2O$, dried overnight in a vacuum oven at 60° C. and pulverized.

The pigment is incorporated into a 50/50 metallic lacquer, sprayed onto metal panels and exposed in Florida together with the panels of this Example and Control 1. After 3 months, this control sample showed a spectroscopically measured QAQ loss of 17%.

EXAMPLE 5

Twenty g of hot water-leached plant-made crude QAQ are dissolved in 85 ml concentrated (96%) sulfuric acid as before; the solution is high-turbulence drowned into water, the resulting slurry heat-developed, filtered and the filtercake washed acid-free, all steps being similar to Example 1. The filter cake is kept under water.

The wet filter cake of QAQ is slurried with water in a beaker to a total volume of about 700 ml and dispersed vigorously by a Gifford-Wood homogenizer for about 5 minutes. The pH of the slurry is adjusted to 7.5 with dilute aqueous NaOH.

A solution of 5.50 g $MnSO_4.H_2O$ and 40 g urea in 200 ml water is prepared; its pH is measured as 4.45. Under stirring, the pH is adjusted to 7.0 by dilute aqueous NaOH.

The manganese-urea aqueous solution is added in small portions to the QAQ slurry under stirring. The slurry is heated to 95° C. to hydrolyze the urea and held for 3 hours under continued agitation. At the end of that time, the slurry has a pH of 6.5. The pH is adjusted to 7.5 by dropwise adding dilute NaOH solution and stirring for another 15 minutes. The slurry is then filtered, the filter cake washed with water and dried at 70°–75° C. to yield 21.3 g pigment.

As described in Example 1, a 50/50 metallic lacquer is prepared from the pulverized pigment and aluminum flake, sprayed onto metal panels and exposed in Florida. After 3 months, the spectroscopically measured QAQ loss is 15%.

A control sample of untreated QAQ pigment is prepared by high-turbulence drowning as described above. Without prior addition of manganese-urea solution and heating, the reslurried QAQ presscake is adjusted in its pH to 7.5 by dilute aqueous NaOH at room temperature, the slurry filtered, the filter cake washed with water and dried at 70°–75° C. A 50/50 metallic lacquer panel prepared with this untreated QAQ pigment shows a spectroscopic QAQ loss of 35% after the same 3 months of Florida exposure.

I claim:

1. A process of photostabilizing a pigment composition which consists essentially of quinacridonequinone or a solid solution thereof comprising treating said pigment composition dispersed in aqueous slurry with from 2.5 to 20 percent by weight, based on quinacridonequinone, calculated as $Mn(OH)_2$, of an aqueous solution of a divalent manganese salt and supplying $OH^-$ ions to said aqueous solution to slowly precipitate a manganese species on the pigment composition.

2. The process of claim 1 wherein an aqueous slurry of the pigment composition is heated to 40° to 100° C. its pH adjusted to near neutral, the water soluble manganese (II) salt added and the pH raised to 7.5 to 10.0 with an alkaline hydroxide.

3. The process of claim 1 wherein urea and a water soluble divalent manganese salt are added to an aqueous slurry of the pigment composition, and the slurry is heated to from 90° to 100° C. to precipitate the manganese species on the pigment composition.

4. A pigment composition prepared by the process of claim 1.

* * * * *